US010999265B2

(12) United States Patent
Ma (10) Patent No.: US 10,999,265 B2
(45) Date of Patent: May 4, 2021

(54) METHOD AND SYSTEM FOR DEPLOYING WIRELESS IOT SENSOR NODES (71) Applicant: TEAM ONE INTERNATIONAL HOLDING PTE LTD., Singapore (SG)

(72) Inventor: ZaiHang Ma, Singapore (SG)

(73) Assignee: TEAM ONE INTERNATIONAL HOLDING PTE LTD., Singapore (SG)

( * ) Notice: Subject to any disclaimer, the term of this patent is extended or adjusted under 35 U.S.C. 154(b) by 365 days.

(21) Appl. No.: 16/188,889

(22) Filed: Nov. 13, 2018

(65) Prior Publication Data

US 2019/0149530 A1 May 16, 2019

Related U.S. Application Data (60) Provisional application No. 62/586,841, filed on Nov. 15, 2017.

(51) Int. Cl.
| H04L 29/06 | (2006.01) |
| H04W 12/06 | (2021.01) |
| H04W 4/80 | (2018.01) |
| H04W 12/04 | (2021.01) |
| H04L 29/08 | (2006.01) |

(Continued)

(52) U.S. Cl.
CPC .......... *H04L 63/061* (2013.01); *H04L 9/3215* (2013.01); *H04L 63/08* (2013.01); *H04L 67/12* (2013.01); *H04L 67/34* (2013.01); *H04W 4/70* (2018.02); *H04W 4/80* (2018.02); *H04W 12/04* (2013.01); *H04W 12/06* (2013.01); *H04L 2463/082* (2013.01)

(58) Field of Classification Search
CPC ....... H04L 63/061; H04L 67/34; H04L 67/12; H04L 63/08; H04L 63/18; H04L 9/3215; H04W 4/70; H04W 12/06; H04W 4/80; H04W 12/04; H04W 12/041; H04W 12/55; H04W 12/0471
See application file for complete search history.

(56) References Cited

U.S. PATENT DOCUMENTS

| 8,107,397 | B1 | 1/2012 | Bagchi et al. |
| 9,628,585 | B2 * | 4/2017 | Gong ..................... H04L 67/42 |
| 10,149,153 | B2 * | 12/2018 | Bernsen ............... H04L 63/061 |

(Continued)

*Primary Examiner* — Michael R Vaughan
(74) *Attorney, Agent, or Firm* — Anova Law Group, PLLC (57) ABSTRACT A method is provided for deploying an IoT device node having a primary communication link for communicating with a management server and a secondary communication link for communicating with a deployment device. The method includes: establishing the secondary communication link with the IoT device node; obtaining device information from the IoT device node; forwarding the device information to the management server; based on the device information, establishing the primary communication link with the IoT device node and sending a first key to the IoT device node over the primary communication link and sending a second key to the deployment device; forwarding the second key to the IoT device node over the secondary communication link; generating a device key based on the first key received on the primary communication link and the second key received on the secondary communication link; and authenticating the IoT device node using the device key.

20 Claims, 6 Drawing Sheets

(51) Int. Cl.
*H04W 4/70* (2018.01)
*H04L 9/32* (2006.01)

(56) References Cited

U.S. PATENT DOCUMENTS

| | | | |
|---|---|---|---|
| 2005/0028001 A1 | 2/2005 | Huang et al. | |
| 2006/0251256 A1* | 11/2006 | Asokan | H04W 12/003 |
| | | | 380/270 |
| 2008/0044028 A1 | 2/2008 | Sun et al. | |
| 2008/0222711 A1* | 9/2008 | Michaelis | H04W 12/06 |
| | | | 726/7 |
| 2012/0195431 A1 | 8/2012 | Morchon et al. | |
| 2016/0134640 A1* | 5/2016 | Cregg | H04L 63/126 |
| | | | 713/168 |
| 2016/0330182 A1* | 11/2016 | Jeon | H04L 63/062 |
| 2017/0055148 A1* | 2/2017 | Zimmerman | H04L 9/0877 |
| 2017/0078881 A1* | 3/2017 | Lee | H04L 63/06 |
| 2018/0241549 A1* | 8/2018 | An | H04L 9/0822 |
| 2018/0376318 A1* | 12/2018 | Wang | H04L 9/0838 |
| 2020/0029206 A1* | 1/2020 | Zhang | H04L 9/0861 |

* cited by examiner

METHOD AND SYSTEM FOR DEPLOYING WIRELESS IOT SENSOR NODES

RELATED APPLICATIONS

This application claims priority to U.S. Provisional Patent Application No. 62/586,841, filed on Nov. 15, 2017, content of which is incorporated by reference in its entirety.

FIELD OF THE TECHNOLOGY

This application relates to the field of Internet-of-Things (IoT) technologies and, specifically, to a wireless IoT sensor node and a system and method for deploying wireless IoT sensor nodes.

BACKGROUND OF THE DISCLOSURE

Internet-of-Things (IoT) technology is under dramatic development for applications in many areas, such as Smart City, M2M (machine-to-machine), and others. Wireless IoT sensor nodes are key components in the IoT network, which are connected with the IoT network using narrow band wireless networks to sense the field conditions and to execute functions in a wide spectrum.

More recently, various narrow band wireless communication technologies have been developed for different applications, such as BLE, Zigbee, NB-IoT, Sigfox, and LORA, etc. These technologies serve the purpose of obtaining reliable and secured data communication after the sensor nodes have been connected to the network.

The IoT sensor nodes generally use one narrow band wireless communication link with other network devices. When an IoT sensor node is to be deployed, the platform management system needs to have information of the IoT sensor node in a preloaded white list file on the platform management system. Thus, complicated operations and software changes may often be needed to allow the IoT sensor node to join the network and make such information to be usable by the platform management system.

The disclosed methods and systems are directed to solve one or more problems set forth above and other problems.

SUMMARY

In one aspect of the present disclosure, a method is provided for deploying an IoT device node in an IoT network, and the IoT device node has a primary communication link capable of communicating with a management server and a secondary communication link capable of communicating with a deployment device. The method includes: establishing the secondary communication link with the IoT device node; obtaining device information from the IoT device node; forwarding the device information to the management server; based on the device information, establishing the primary communication link with the IoT device node and sending a first key to the IoT device node over the primary communication link and sending a second key to the deployment device; forwarding the second key to the IoT device node over the secondary communication link; generating a device key based on the first key received on the primary communication link and the second key received on the secondary communication link; and authenticating the IoT device node using the device key from the IoT device node.

In another aspect of the present disclosure, a system is provided for deploying an IoT (Internet of Things) device node in an IoT network. The system includes a management server and a deployment device. The management server is capable of communicating with the IoT device node over a primary communication link; and the deployment device is capable of communicating with the IoT device node over a secondary communication link. The deployment device is configured to: establish the secondary communication link with the IoT device node, obtain device information from the IoT device node, and forward the device information to the management server. The management server is configured to: based on the device information, establish the primary communication link with the IoT device node, generate a first key and a second key based on the device information, send the first key to the IoT device node over the primary communication link, and send the second key to the deployment device. The deployment device is further configured to forward the second key to the IoT device node over the secondary communication link. The IoT device node generates a device key based on the first key received on the primary communication link and the second key received on the secondary communication link, and the management server is further configured to authenticate the IoT device node using the device key from the IoT device node.

Other aspects of the present disclosure can be understood by those skilled in the art in light of the description, the claims, and the drawings of the present disclosure.

BRIEF DESCRIPTION OF THE DRAWINGS

The following briefly introduces the accompanying drawings used for describing the various embodiments. Apparently, the accompanying drawings show merely some embodiments of the present invention, and a person skilled in the art may derive other drawings from these accompanying drawings without creative efforts.

DETAILED DESCRIPTION

The following describes the technical solutions in the disclosed embodiments of the present invention with reference to the accompanying drawings. Apparently, the described embodiments are merely some but not all the embodiments of the present invention. Other embodiments obtained by a person skilled in the art based on the embodiments of the present invention without creative efforts shall fall within the protection scope of the present disclosure.

Figure 1:
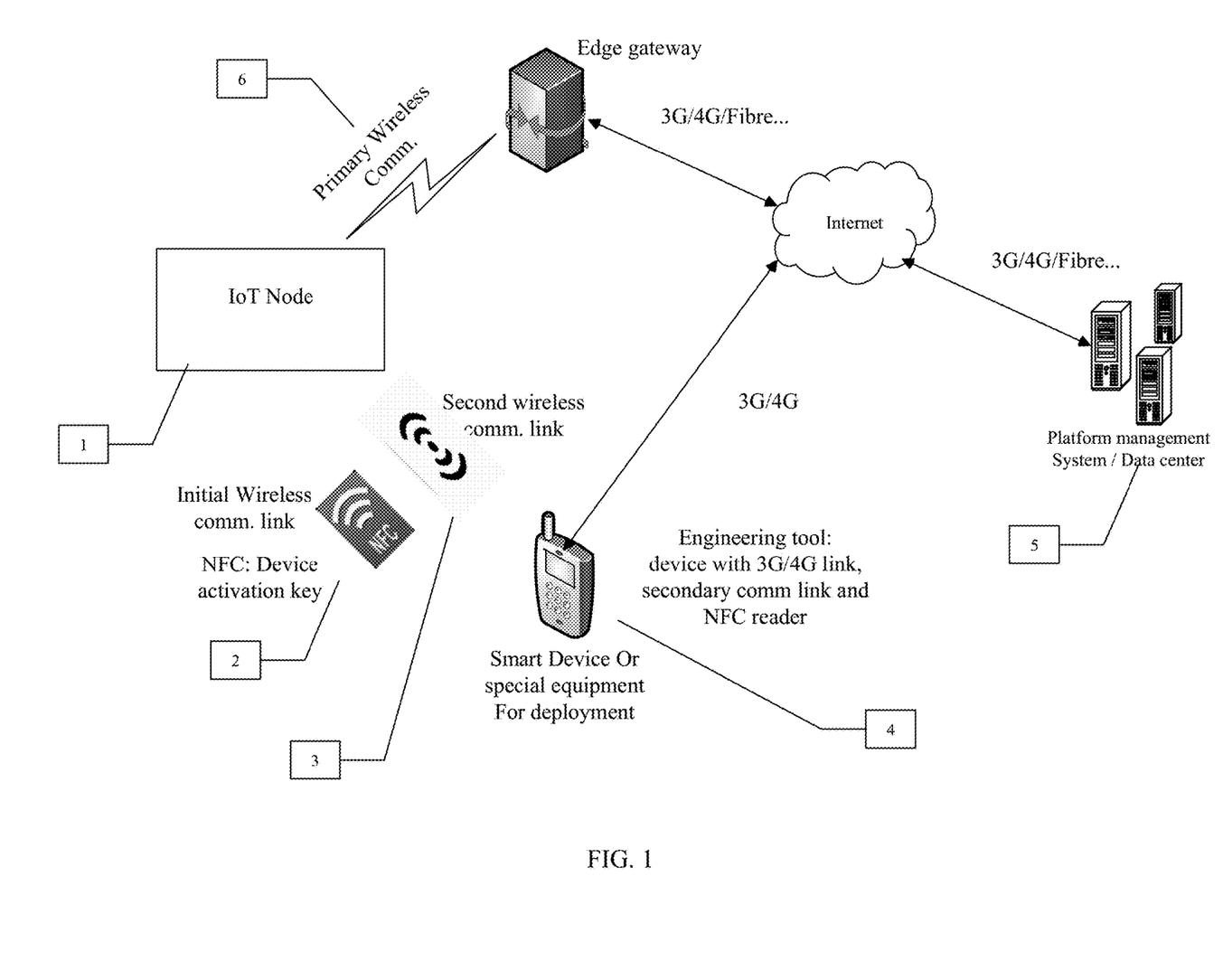
FIG. 1 illustrates an exemplary IoT system for an IoT device node to be deployed consistent with the disclosed embodiments.

The present disclosure provides an improved wireless IoT device node and an improved method and system for deploying the same. FIG. 1 illustrates an exemplary operating environment for an IoT device node to be deployed for usage consistent with the disclosed embodiments.

As shown in FIG. 1, the operating environment (e.g., an IoT system) may include an IoT device node 1, a deployment device 4, and a management server 5. Although one IoT device node, one deployment device, and one management server are illustrated, any number of IoT device node, deployment device, and/or management server may be included.

The IoT device node 1 may also be referred as an IoT device, an IoT sensor node, an IoT node, a device node, or simply a node. The IoT device node 1 may include any appropriate Internet-of-Things (IoT) device wirelessly and/or wiredly connected to the Internet to provide certain functionality. The IoT device node 1 may have a plurality of communication channels (or links) and support various communication protocols. For example, the IoT device node 1 may include an NFC tag for NFC connection, a narrow-bandwidth wireless communication link, and/or a wide-bandwidth wireless communication link.

The deployment device 4 may be referred as deployment equipment, special equipment for deployment, a smart device, or the like. The deployment device 4 may be provided to securely deploy the IoT device node 1 in a significantly efficient and convenient way. The deployment device 4 may be a smart phone or tablet PC or any other smart device with various communication functionalities, such as an NFC (near field communication) reader, BLE (Bluetooth low energy) and 3G/4G (third generation/fourth generation) communication capabilities.

The management server 5 may be referred as a platform management system and/or a data center provided for control, deploy, manage, and maintain the IoT network. The management server 5 may include any appropriate server computer or server clusters or cloud server for providing the management functions, and may also include a system database for storing management information.

Figure 6:
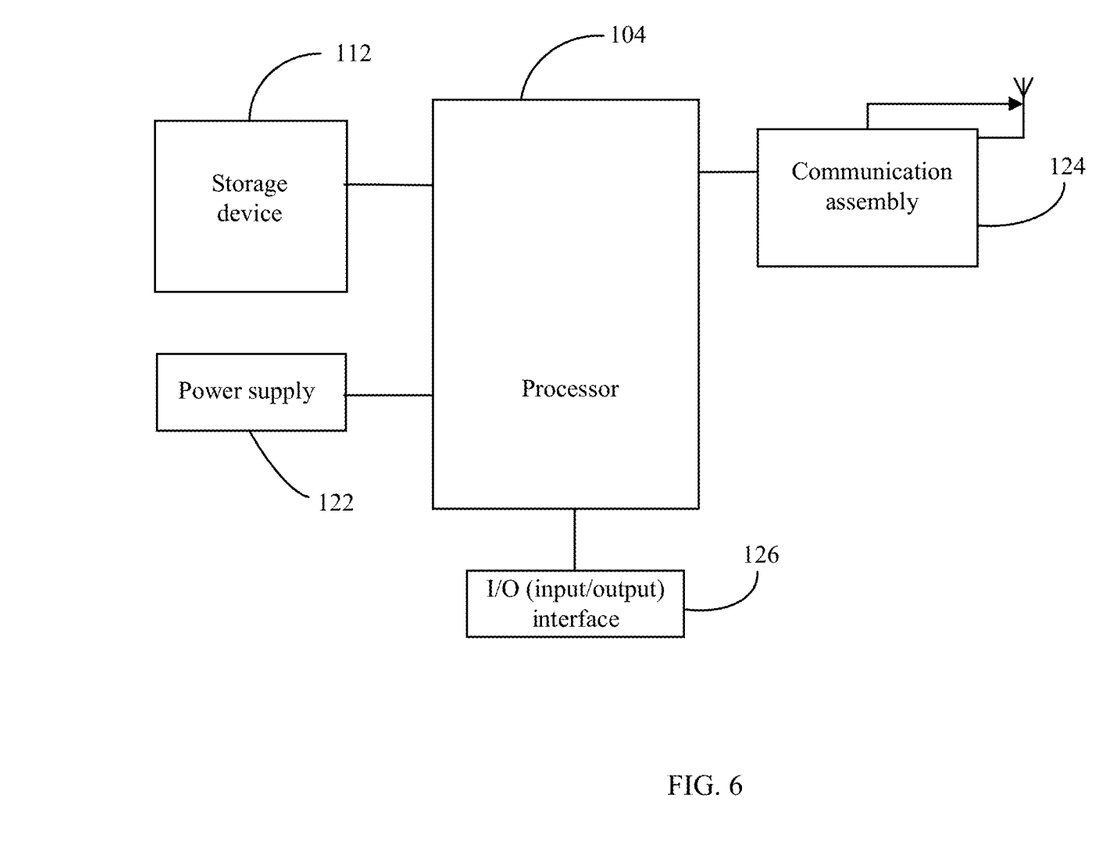
FIG. 6 illustrates an exemplary computing system consistent with the disclosed embodiments.

FIG. 6 illustrates an exemplary computing system that may be used to implement the IoT device node 1, the deployment device 4, and/or the management server 5. As shown in FIG. 6, the computing system may include a processor 104, a storage device 112, a power supply 122, an I/O (input/output) interface 126, and a communication assembly 126.

The processor 104 may include a general-purpose processor, a central processing unit (CPU), a graphic processing unit (GPU), a signal processing unit, a microcontroller, and/or a single-board computer, etc. The processor 104 may facilitate interaction with a user through the I/O (input/output) interface 126 or the communication assembly 126.

The storage device 112 may configured to store various types of data and may be implemented by any type of volatile or non-volatile storage device or a combination thereof, such as SRAM (Static Random-Access Memory), EEPROM (Electrically-Erasable Programmable Read-Only Memory), EPROM (Erasable Programmable Read Only Memory), PROM (Programmable Read-Only Memory), ROM (Read-Only Memory), magnetic memory, flash memory, disk or optical disk.

Power supply 122 may provide power to various components of the computing system. The I/O interface 126 may provide an interface between the processor 104 and any peripheral interface module, which may be a display terminal, a keyboard, a click wheel, a button, a sensor, an actuator, or the like.

The communication assembly 124 is configured to facilitate wired or wireless communication between the computing system and other devices. The computing system may access a wireless network based on a communication standard, such as WiFi, 2G or 3G or 4G, or a combination thereof. Further, the communication assembly 124 also comprises an NFC (Near Field Communication) module to facilitate short-range communication. For example, the NFC module can be based on RFID (Radio Frequency Identification) technology, IrDA (Infra-red Data Association) technology, UWB (Ultra Wideband) technology, BT (Bluetooth) technology and others.

Returning to FIG. 1, in operation, the IoT device node 1 may be connected to the management server 5 via a primary wireless communication link. Specifically, through the primary wireless communication link, the IoT device node 1 may be connected to a edge gateway (not numbered), which may be connected to the management server 5 through the Internet using, for example, 3G/4G or optical fiber technologies.

The deployment device 4 may also be connected to the management server 5 through the Internet using, for example, 3G/4G technologies. Other communication links may also be used. The deployment device 4 may be a pre-authenticated device, with an approved device ID. For example, the deployment device 4 may be authenticated by the management server 5 based a 3G/4G wireless communication link after submitting password, security key, biometrics feature of user, etc.

Further, the IoT device node 1 may be connected to the deployment device 4 for deployment through short-range communication links. The deployment device 4 may be pre-authenticated by the management server 5, and may have pre-set NFC reader configuration, for multiple level access to the IoT device node 1 for different applications. That is, the deployment device 4 may have or receive pre-set NFC reader configuration, for multiple users, multiple levels of access for different applications, etc. The deployment device 4 may be able to identify the IoT device node 1 and thus to control the access level of the IoT device node.

When the deployment device 4 is brought near to the to-be-deployed device node in the field operation, an initial (or first) communication link 2 (such as an NFC communication link) may wake the to-be-deployed device node and communication of the initial communication link 2 can be established. The activation key could be near field communication technology (NFC) or a proximity switch.

Through the initial communication link 2, the IoT device node 1 can submit the information about a second wireless communication link 3 to the deployment device 4 in preset configuration of secured data message. Thus, the second wireless communication link 3 can be established between the deployment device 4 and the IoT device node 1. The initial communication link 2 and the second wireless communication link 3 may be referred as secondary wireless communication links between the IoT device node 1 and the deployment device 4. In certain embodiments, the second wireless communication link may be a broad-band wireless link and only the second wireless communication link may be referred as the secondary wireless communication link, while the primary wireless communication link may be a narrow-band wireless link.

Accordingly, during deployment, the IoT device node 1 may be connected to both the deployment device 4 and the management server 5. The IoT device node 1 may be connected to the management server 5 through the primary wireless communication link 6, and may connected to the deployment device 4 through the wireless communication links 2 and 3. Other connection methods may also be used.

The primary wireless communication link 6 may include a narrow band wireless link such as NB-IoT, LORA, BLE, Zigbee, or Sigfox, etc. The secondary wireless communication links may include a short-range wireless communication format including, for example, BLE, Zigbee, etc. In certain embodiments, only the primary wireless communication link 6 is used for normal operation for the IoT device node 1, while the wireless communication links 2 and 3 are used for deployment and registration. After the IoT device node 1 is deployed and registered in the IoT system, the wireless communication links 2 and 3 may be switched off for power saving.

Because the IoT device node 1 is connected to both the deployment device 4 and the management server 5, secured device authentication processes, such as two factor authentication (2FA), may be applied to approve the device nodes to join the system by the management server 5.

More specifically, the deployment device 4 is provided to function as a pre-authenticated and secured device to send request for connection to the platform management system (i.e., the management server 5) as a representative of the IoT device node 1 to-be-connected. The deployment device 4 is pre-authenticated and registered in the management system, and pre-configured as required by the user of the IoT device node 1. For example, the deployment device 4 may be authenticated through various security technologies, such as device ID, password, security key and biometrics features, in order to keep the system data safe. After authentication, the deployment device 4 may be used as a trusted middle device to make data/message exchange between the IoT device node 1 and the platform management system 5. Thus, the data/message exchange could be completed for data validation and communication in a safe and secured way.

Figure 2:
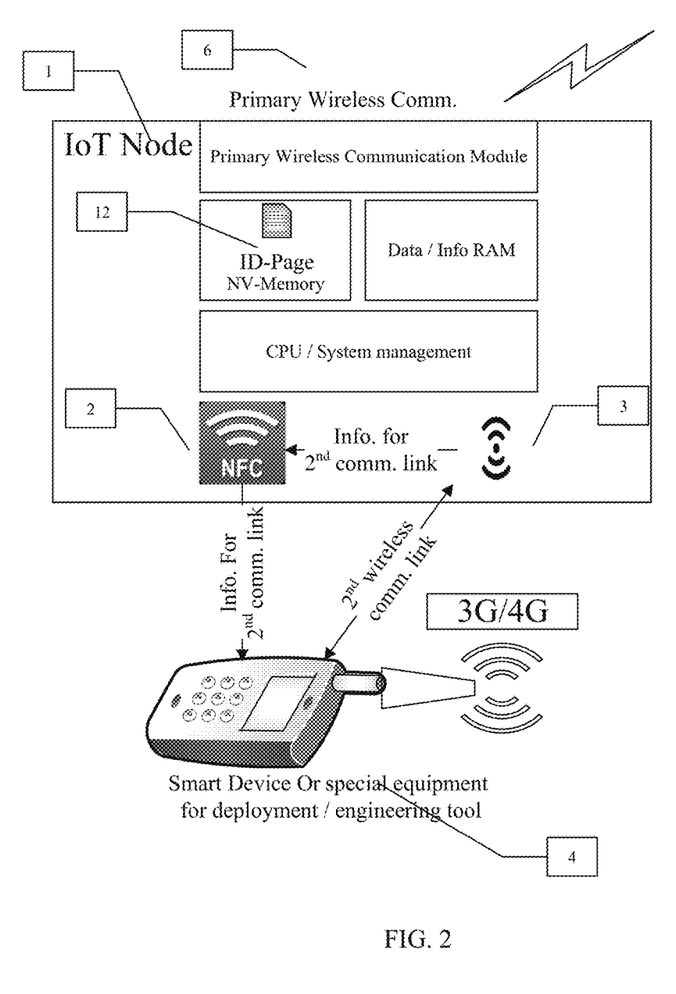
FIG. 2 illustrates an IoT device node and interaction between the IoT device node and a deployment device consistent with the disclosed embodiments.

FIG. 2 illustrates more details of the IoT device node 1 and connection between the IoT device node 1 and the deployment device 4. As shown in FIG. 2, the IoT device node 1 includes a primary wireless communication module to establish the primary wireless communication link 6 with the management server 5.

The IoT device node 1 also includes a processor (CPU) to perform system management. The IoT device node 1 also includes a memory or other storage device for storing data and other information. Specifically, the IoT device node 1 may include a device identification page or simply ID-page 12 stored in a non-volatile memory or other storage device.

Figure 5:
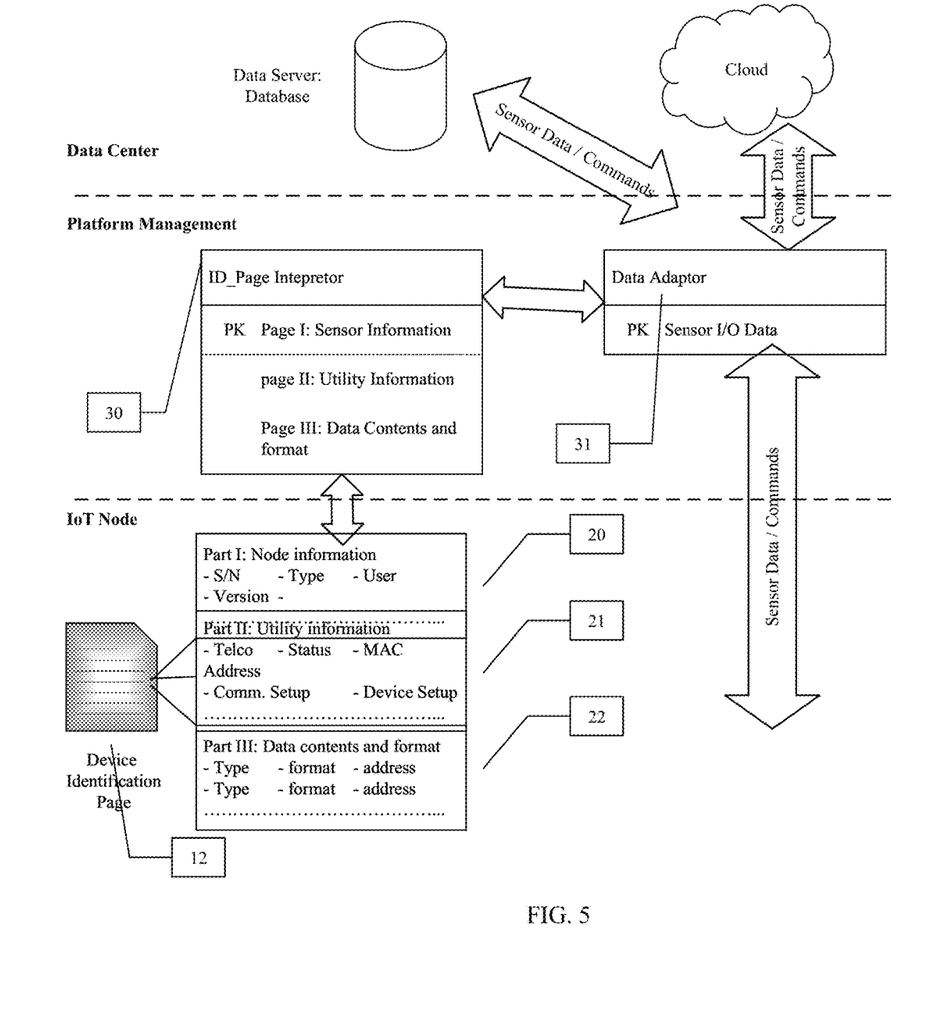
FIG. 5 illustrates an exemplary ID-page and its usage for device registration and data translation consistent with the disclosed embodiments.

The ID-page 12 may include any appropriate date to provide information for deployment, registration, and operation of the IoT device node 1. The ID-Page 12 may be provided in the IoT device node 1 to allow the IoT device node 1 to introduce itself to the deployment device 4 and/or to the management server 5 and to be registered as a member of the IoT system if the IoT device node 1 is authenticated. Based on the ID-page 12, a data adaptor may be created to translate the data bi-directionally between the management server 5 (e.g., the data center) and the IoT device node 1. FIG. 5 illustrates an exemplary ID-page and its usage for device registration and data translation.

As shown in FIG. 5, the device identification page or ID-page 12 is residing in the IoT device node 1. The ID-page 12 may include a plurality of parts containing different types of information. For example, the ID-page 12 may include a first part 20 (Part I) containing node information, such as serial number, type of the device node, user information, and version number, etc. The ID-page 12 may also include a second part 21 (Part II) containing utility information, such as telecommunication operator information, device status, MAC address, communication setup configuration and parameters, device setup configuration and parameters, etc. The ID-page 12 may also include a third part 22 (Part III) containing data contents and format. The format may be used by other devices to interpret the data contents. The data in the ID-page may be organized in a type, format, and address format, so that the data exchange between the device node and the platform management and/or the data exchange between the device node and the deployment device can be performed. Other information may also be included.

Correspondingly, the platform management or management server may include an ID-page interpreting module or interpreter 30 to record the device node information (i.e., the first part 20), the utility information (i.e., the second part 21), and other data of the device node. As shown in FIG. 5, the ID-page interpreter 30 may include a public key or other encryption key for the device node, a first page (Page I) containing device information or sensor information (if the device node is a sensor or has any sensing function), a second page (Page II) containing device utility information, and a third page (Page III) containing data contents and format. Other information may also be included.

Further, the management server may also include a data adaptor or data connector 31 created automatically based on the input from the ID-page interpretor module, and functions between the data center and data I/O from/to the device node.

Returning to FIG. 2, the deployment device 4 has several wireless communication links. For example, the deployment device 4 may have a long-range wireless communication link (e.g., 3G/4G cellular wireless link) to connect to the management server 5, and may have two short-range wireless communication links to connect to the IoT device node 1. Specifically, the deployment device 4 may use an NFC channel as the initial wireless communication link 2. In certain embodiments, the deployment device 4 may have After the initial wireless communication link 2 is established, information about the second wireless communication link 3 may be obtained by the deployment device 4 to establish the second wireless communication link 3 between the deployment device 4 and the IoT device node 1.

That is, for the IoT device node 1 and the deployment device 4, the initial wireless communication link 2, such as the NFC link, is built for the initial activation of the IoT device node 1 and the authentication for the second wireless communication link 3. Before connecting to the deployment device 4, the IoT device may be referred as an orphan node, e.g., an unauthenticated or unconnected device node, which may usually be in the sleep mode in order to save power and reduce wireless emission to the environment. The deployment device 4 is provided to activate the orphan node to make the second wireless communication link for starting operation. In certain embodiments, in the IoT device node 1, an NFC tag may be provided for establishing the NFC link 2, and a second communication interface may be provided for establishing the second wireless communication link 3. Further, the NFC tag may contain the secured data/information about the second wireless communication link, such as address, and security key, etc.

Figure 3:
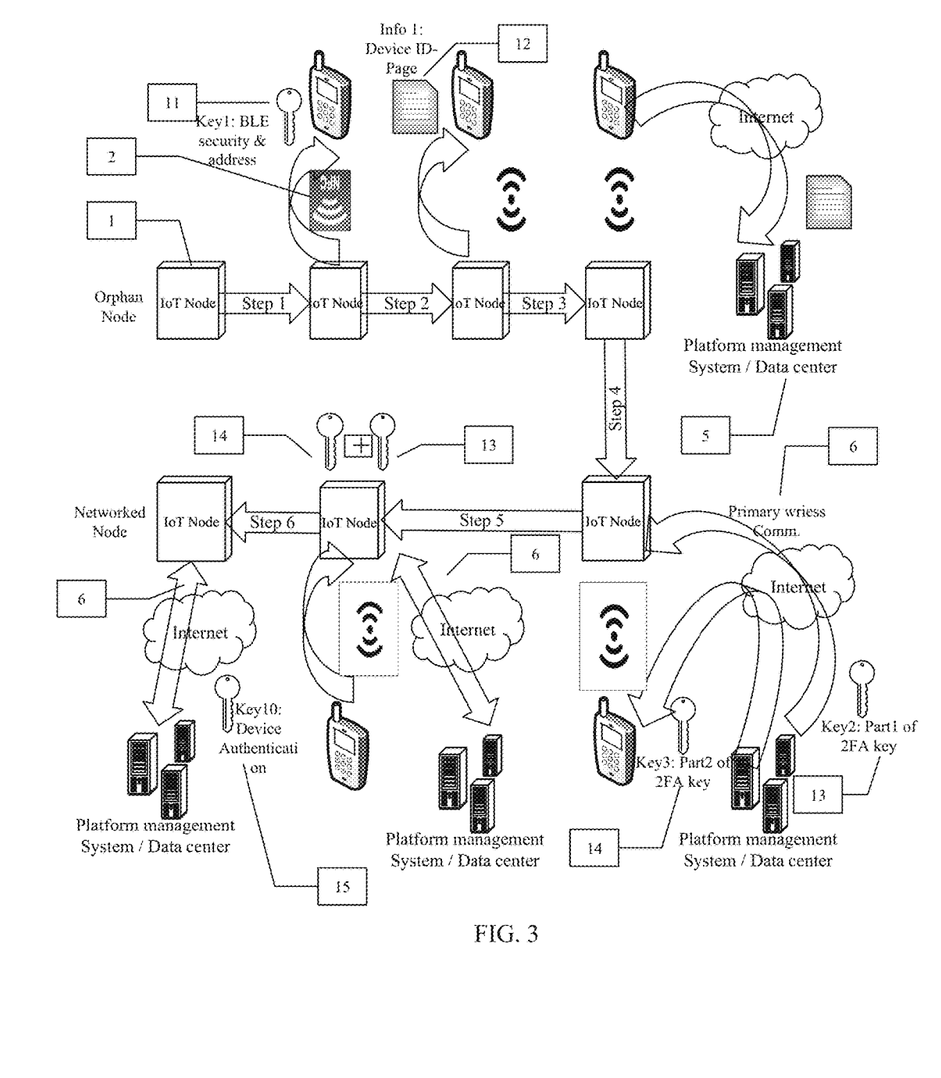
FIG. 3 illustrates an exemplary deployment process for an IoT device node consistent with the disclosed embodiments.

FIG. 3 illustrates details of a deployment process for deploying a device node to an existing IoT network using a two-factor-authentication (2FA). As shown in FIG. 3, at the beginning, the IoT device node 1 is in an orphan node state, which is unauthenticated and unconnected.

To start the deployment process of the IoT device node 1, the deployment device is positioned near to the IoT device node 1, such that the NFC tag in the IoT device node 1 and the NFC reader in the deployment device can establish an NFC connection. From the NFC reader, the deployment device can get the information item 11, i.e., information about the second wireless communication link between the IoT device node 1 and the deployment device, such as address and security key, etc.

Further, after the NFC communication completed (Step 1), the IoT device node 1 and the deployment device start to associate themselves through the second wireless communication link with accordance to the information provided from previously established NFC connection.

Furthermore, after successful association of the second wireless communication link between the IoT device node 1 and the deployment device, the deployment device reads the ID-Page 12 from the IoT device node 1 (Step 2).

After the deployment device obtains the ID-Page 12, the deployment device sends the ID-Page to platform management system or management server 5 through a trusted wireless communication link, such as 3G/4G, between the deployment device and the management server 5 (Step 3).

The management server 5 processes the ID-page of the IoT device node 1 to determine whether the information in the ID-page is valid, and whether to establish connection to the IoT device node 1. After the validation of the information in the ID-page, the management server 5 may issue a permission for commissioning of the primary wireless communication link 6 for the IoT device node 1 through the deployment device (Step 4).

Further, the primary wireless communication link may be set up temporarily for commissioning operation between the management server 5 (e.g., the data center) and the IoT device node 1. A primary security key 13 (e.g., Key2: part 1 of 2FA key) may be sent to the IoT device node 1 through the primary wireless communication link 6, while a secondary security key 14 (e.g., Key3: part 2 of the 2FA key) may be issued from the management server 5 to the deployment device through a secured data transmission path (e.g., a 3G/4G link) (Step 5).

The deployment device then send the secondary security key 14 to through another secured data transmission path (e.g., the second wireless communication link). Thus, both Key1 and Key2 are sent to the IoT device node 1. After the IoT device node 1 receives the two keys, the IoT device node 1 may generate a final device authentication key 15 and submit the final device authentication key 15 to the management server 5 through the primary wireless communication link 6.

After receiving the final device authentication key 15 from the IoT device node 1, the management server 5 may validate the received key and, based on the validation result, authorize or reject the IoT device node 1 to join the management system accordingly. That is, if the management server 5 determines that the final key is validated, the IoT device node 1 is able to be registered in the management system and allowed to communicate with the management server or data center through the primary wireless communication link 6, i.e., the narrow band wireless link. Further, the management server 5 may broadcast a message to the deployment device and other relative devices/systems to indicate the validation of the IoT device node 1.

On the other hand, if the management server 5 determines that the final key from the IoT device node 1 cannot be validated, the management server 5 may log the IoT device node 1 as an attempted node and may produce an alert to be broadcasted over the IoT system, therefore acknowledging to the user for potential network attacks or installation failure.

After the management server 5 validates the final key and determines that the IoT device node 1 is permitted to join the IoT system, the management server 5 may register the IoT device node 1 in the platform management system (Step 6). Further, the ID-Page of the IoT device node may be further interpreted by the management server 5 for normal operation. The secondary wireless communication links may be terminated by the IoT device node 1 and the deployment device may be removed.

Figure 4:
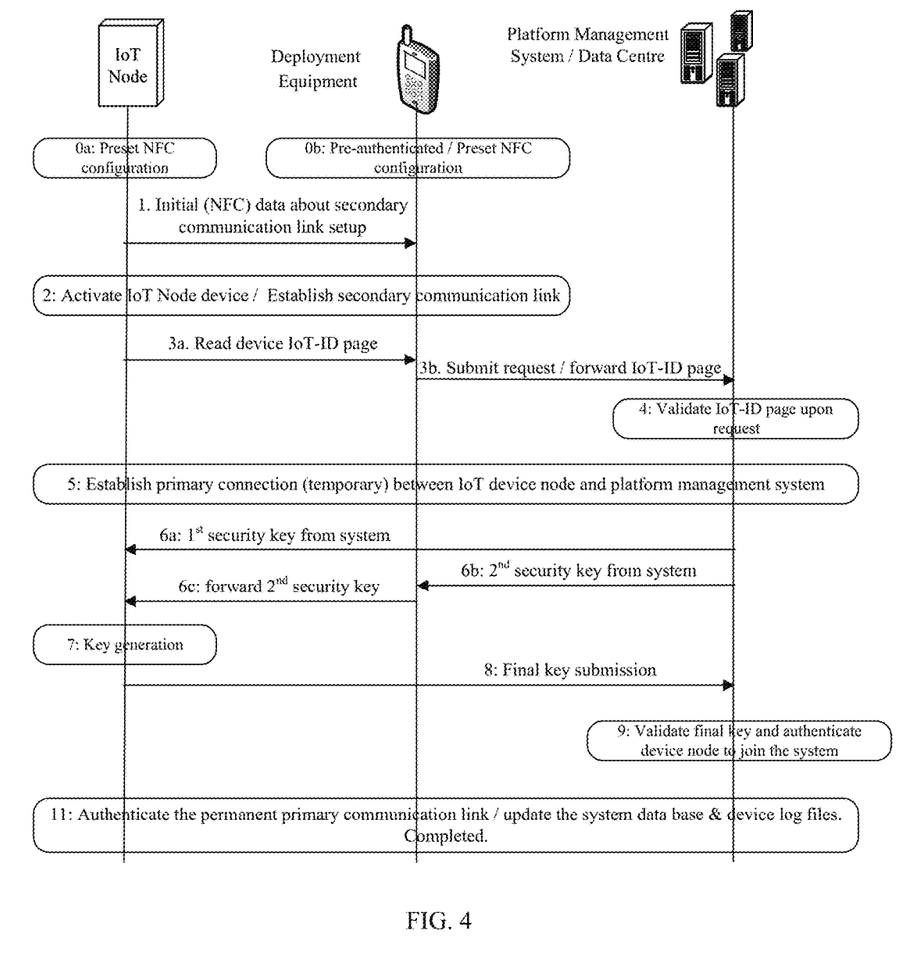
FIG. 4 illustrates a sequence diagram of a signaling process of an IoT device node being activated, validated, authenticated and finally approved and registered in the system consistent with the disclosed embodiments.

FIG. 4 illustrates a signaling process among the IoT device node, the deployment device, and the management server (i.e., the platform management system and data center) when a device node successfully joins the IoT system.

As shown in FIG. 4, the IoT device node may have a preset NFC configuration for NFC connection (0a), and the deployment device may be pre-authenticated by the platform management system and may have a preset NFC configuration to connect to the IoT device nodes.

After the NFC connection is established, the IoT device node sends initial data about the secondary communication link setup to the deployment device. The deployment device activates the IoT device node (e.g., out of the orphan state) and establishes the secondary communication link with the IoT device node.

Further, the deployment device reads the ID-page of the IoT device node (3a) and submits a validation request and forwards the IP-page to the platform management system. The platform management system validates the ID-page upon the validation request. After the validation, the primary communication link is established between the IoT device node and the platform management system.

Using the primary communication link, the first security key is sent to the IoT device node from the platform management system, while the second security key is forwarded to the deployment device by the platform management system. The first security key and the second security key are part of the 2FA key generation process.

Further, after receiving both the first security key and the second security key, the IoT device node generate a final key based on the first security key and the second security key by, for example, combing the first security key and the second security key or using a predetermined algorithm to calculate a final key with the first security key and the second security key as inputs.

The IoT device node then submits the generated final key to the platform management system for validation. The platform management system validates the final key and authenticates the permanent primary communication link, updates the system data base and device log files. The successfully 2FA based deployment process is then completed.

Because both wireless communication links (primary, secondary) make secured data exchange only after devices are authenticated, it makes the IoT system more secured and safer from attack. Both communication links may be used for data/information exchange, commanding and control, device programming and configuration for engineering purposes.

For example, during deployment or after deployment, the deployment device may maintain the secondary wireless communication link with the IoT device node to perform other configuration and/or maintenance tasks. This may improve greatly the flexibility for program and configuration update, as the secondary wireless communication link may have wide data bandwidth and the device node programming and software update/setup configuration/diagnosis may be done through this secondary wireless communication interface, with quick response time.

Although the above embodiments use the two-factor authentication (2FA) as an example, other forms of authentication process may also be used, and the present disclosure more generally provides for an improved method of occupying multiple wireless communication links with the introduction of a deployment device, to establish connection between device nodes and data center in an easy and secured manner.

Furthermore, the introduced ID-Page in each IoT device node may allow the device node to introduce itself to the IoT system and to be registered as a member of the IoT network if the device node is authenticated. A corresponding data adaptor may then be created to translate the data bi-directionally between the data center and the device node, based on the understanding to the ID-Page.

Therefore, an IoT device node with secured secondary wireless communication, which is activated in a secured way wirelessly from a deployment device, would be beneficial to the security of device node deployment, with the least amount of user interaction required. Furthermore, the usage of identification page can make the registration process simpler and easier with better scalability of the IoT system. This ID-page is created on each IoT device node in a predefined format which is understandable by the platform management system based on an agreed protocol. Thus, the device node can be automatically registered in the platform management system upon the validation of information provided in the ID-page, therefore improving the deployment efficiency and security. In addition, the device node may also have better performance in power consumption because it allows itself to be activated/deactivated from deployment device. The device node may be configured to wake up the processor (e.g., an MCU or microcontroller unit) through an initial activation peripheral, for example, an NFC communication peripheral. Thus, the device node can have the capability to be activated in a safe/secured manner Accordingly, by using the disclosed methods and systems, an improved method of occupying multiple wireless communication links with the addition of a deployment equipment is provided, so as to establish connection between the device nodes and data center. Secured device authentication processes, such as two factor authentication (2FA), can then be applied to approve the device node to join the IoT system. An ID-Page is produced in each device node, which allows the device node to introduce itself to the IoT system and to be registered as a member of the IoT network if the device node is authenticated. A data adaptor is created to translate the data bi-directionally between the data center and device node, based on the understanding to the ID-Page.

An orphan node shall usually be in sleep mode in order to save power and reduce the wireless emission to the environment, the deployment equipment is used to activate the orphan node to make the secondary wireless link starting operation.

Both primary and secondary wireless communication links make secured data exchange only after the devices are authenticated, which makes the IoT system more secured and safer from attack. Both communication links may be used for data/information exchange, commanding and control, device programming and configuration for engineering purposes.

The deployment equipment is added to function as a pre-authenticated and secured device to send request for connection to the platform management system as representative of the device node to-be-connected. The deployment equipment is pre-authenticated and registered in the IoT system and pre-configured as required by the user. The deployment equipment authentication may be done through various security technologies, such as device ID, password, security key and biometrics features, in order to keep the system data safe. The deployment equipment is used to perform as a trusted middle device to make data exchange/messages between the device node and the platform management system, thus temporary data/information exchange may be completed for data validation and communication in a safe and secured way. Other benefits or advantages may also be included.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A method for deploying an IoT (Internet of Things) device node in an IoT network, wherein the IoT device node has a primary communication link capable of communicating with a management server and a secondary communication link capable of communicating with a deployment device, the method comprising:
    establishing, by the deployment device, the secondary communication link with the IoT device node;
    obtaining, by the deployment device, device information from the IoT device node;
    forwarding, by the deployment device, the device information to the management server;
    based on the device information, establishing, by the management server, the primary communication link with the IoT device node and sending a first key to the IoT device node over the primary communication link and sending a second key to the deployment device;
    forwarding, by the deployment device, the second key to the IoT device node over the secondary communication link;
    generating, by the IoT device node, a device key based on the first key received on the primary communication link and the second key received on the secondary communication link; and
    authenticating the IoT device node, by the management server, using the device key from the IoT device node.

2. The method according to claim 1, wherein the deployment device is pre-authenticated and registered in the IoT network by the management server.

3. The method according to claim 1, wherein the primary communication link is a narrow-bandwidth wireless communication link, and the secondary communication link is a short-range wireless communication link.

4. The method according to claim 1, wherein establishing the secondary communication link further includes:
    establishing an initial wireless communication link between the IoT device node and the deployment device;
    exchanging security information for the secondary communication link; and
    establishing the secondary communication link based on the security information.

5. The method according to claim 1, wherein the IoT device node includes an NFC (near-field-communication) tag, the deployment device includes an NFC reader, and the initial wireless communication link is an NFC connection.

6. The method according to claim 1, wherein the device information includes an ID-page stored in the IoT device node, and the ID-page contains a plurality parts of information including a first part of node information, a second part of utility information, and a third part of data content and format information.

7. The method according to claim 6, wherein establishing the primary communication link based on the device information further includes:
validating the ID-page by the management server;
after validation of the ID-page, establishing the primary communication link between the management server and the IoT device node; and
generating the first key and the second key based on the ID-page.

8. The method according to claim 6, further including:
based on the ID-page, creating a data adaptor, by the management server, to interpret data from the IoT device node for normal operation.

9. The method according to claim 1, further including:
in the normal operation, disabling, by the IoT device node, the secondary communication link with the deployment device.

10. The method according to claim 1, wherein the first key and the second key are two parts of a two-factor-authentication process.

11. The method according to claim 1, wherein the authenticating the IoT device node using the device key from the IoT device node further includes:
sending, by the IoT device node, the device key to the management server;
validating, by the management server, the device key from the IoT device node; and
after validation of the device key, authenticating and registering, by the management server, the IoT device node in the IoT network.

12. A system for deploying an IoT (Internet of Things) device node in an IoT network, comprising:
a management server capable of communicating with the IoT device node over a primary communication link; and
a deployment device capable of communicating with the IoT device node over a secondary communication link,
wherein the deployment device is configured to:
establish the secondary communication link with the IoT device node,
obtain device information from the IoT device node,
forward the device information to the management server,
wherein the management server is configured to:
based on the device information, establish the primary communication link with the IoT device node,
generate a first key and a second key based on the device information,
send the first key to the IoT device node over the primary communication link,
send the second key to the deployment device,
wherein the deployment device is further configured to forward the second key to the IoT device node over the secondary communication link; and
wherein the IoT device node generates a device key based on the first key received on the primary communication link and the second key received on the secondary communication link, and the management server is further configured to authenticate the IoT device node using the device key from the IoT device node.

13. The system according to claim 12, wherein the deployment device is pre-authenticated and registered in the IoT network by the management server.

14. The system according to claim 12, wherein the primary communication link is a narrow-bandwidth wireless communication link, and the secondary communication link is a short-range wireless communication link.

15. The system according to claim 12, wherein, to establish the secondary communication link, the deployment device is further configured:
establish an initial wireless communication link between the IoT device node and the deployment device;
exchange security information for the secondary communication link; and
establish the secondary communication link based on the security information.

16. The system according to claim 12, wherein the IoT device node includes an NFC (near-field-communication) tag, the deployment device includes an NFC reader, and the initial wireless communication link is an NFC connection.

17. The system according to claim 12, wherein the device information includes an ID-page stored in the IoT device node, and the ID-page contains a plurality parts of information including a first part of node information, a second part of utility information, and a third part of data content and format information.

18. The system according to claim 17, wherein, to establish the primary communication link based on the device information, the management server is further configured to:
validate the ID-page by the management server;
after validation of the ID-page, establish the primary communication link between the management server and the IoT device node; and
generate the first key and the second key based on the ID-page.

19. The system according to claim 17, wherein the management server is further configured to:
based on the ID-page, create a data adaptor to interpret data from the IoT device node for normal operation,
wherein, in the normal operation, the IoT device node disables the secondary communication link with the deployment device.

20. The system according to claim 12, wherein:
the first key and the second key are two parts of a two-factor-authentication process to generate the device key; and
the IoT device node sends the device key to the management server, such that the management server validate the device key from the IoT device node, authenticates and registers the IoT device node in the IoT network.

* * * * *